United States Patent
Gatmir-Motahari et al.

(10) Patent No.: US 9,622,209 B1
(45) Date of Patent: Apr. 11, 2017

(54) ALTERNATIVE LOCATION SOURCE FOR LOW-COST INTERNET BASE STATION SYSTEMS WHEN SATELLITE-BASED POSITIONING SYSTEM COVERAGE IS UNAVAILABLE

(71) Applicant: Sprint Spectrum L.P., Overland Park, KS (US)

(72) Inventors: Sara Gatmir-Motahari, Redwood City, CA (US); Kosol Jintaseranee, Millbrae, CA (US); Heesook Choi, Castro Valley, CA (US)

(73) Assignee: Sprint Spectrum L.P., Overland Park, KS (US)

( * ) Notice: Subject to any disclaimer, the term of this patent is extended or adjusted under 35 U.S.C. 154(b) by 763 days.

(21) Appl. No.: 13/967,790

(22) Filed: Aug. 15, 2013

(51) Int. Cl.
  *H04W 64/00* (2009.01)
  *H04W 84/04* (2009.01)

(52) U.S. Cl.
  CPC ........ *H04W 64/003* (2013.01); *H04W 84/045* (2013.01)

(58) Field of Classification Search
  CPC ........................... H04W 64/003; H04W 84/045
  USPC .............................................. 455/456.1–457
  See application file for complete search history.

(56) References Cited

U.S. PATENT DOCUMENTS

| | | | |
|---|---|---|---|
| 3,710,335 A | 1/1973 | Lepley | |
| 5,736,962 A | 4/1998 | Tendler | |
| 6,233,448 B1 | 5/2001 | Alperovich et al. | |
| 6,608,592 B2 | 8/2003 | McReynolds | |
| 6,963,749 B2 | 11/2005 | Hayashida | |
| 6,993,345 B2 | 1/2006 | Ogino et al. | |
| 7,092,722 B1* | 8/2006 | Oh .................. | H04W 36/18 370/331 |
| 7,283,091 B1 | 10/2007 | Loomis | |
| 7,577,443 B1 | 8/2009 | Moll et al. | |
| 7,595,752 B2 | 9/2009 | Van Digelen et al. | |
| 7,831,216 B1 | 11/2010 | Yenney et al. | |
| 8,059,568 B1* | 11/2011 | Barbee ............ | H04J 3/0688 370/304 |
| 8,121,596 B1 | 2/2012 | Shetty et al. | |
| 9,226,258 B2 | 12/2015 | Jintaseranee et al. | |
| 2006/0252408 A1 | 11/2006 | Faccin et al. | |
| 2007/0041368 A1 | 2/2007 | Lorello | |
| 2007/0058615 A1 | 3/2007 | Hasenfang et al. | |

(Continued)

OTHER PUBLICATIONS

Non-Final Office Action from U.S. Appl. No. 11/954,072, mailed Oct. 14, 2009.

(Continued)

*Primary Examiner* — Erica Navar (57) ABSTRACT

A method and systems for determining a location of a Low-Cost Internet Base Station (LCIB) are described. An LCIB may engage in communication with a macro network using a wireless communication interface, such that the macro network assigns the LCIB to operate as a mobile station on a particular active set of one or more particular sectors. The LCIB may transmit data indicative of the particular active set to the macro network using a backhaul connection to the macro network. Responsive to the LCIB transmitting the data indicative of the particular active set to the macro network, the LCIB may receive a location corresponding to the particular active set from the macro network via the backhaul connection to the macro network.

20 Claims, 7 Drawing Sheets

(56) References Cited

U.S. PATENT DOCUMENTS

2008/0298275 A1* 12/2008 De Sousa ............. H04W 16/18
                                                    370/255
2008/0299992 A1   12/2008 Eitan et al.
2009/0011779 A1    1/2009 MacNaughtan et al.
2009/0316649 A1* 12/2009 Chen .................... H04W 24/02
                                                    370/331
2010/0120447 A1*  5/2010 Anderson ........... H04W 64/003
                                                    455/456.1

OTHER PUBLICATIONS

Final Office Action from U.S. Appl. No. 11/954,072, mailed Apr. 2, 2010.
Non-Final Office Action from U.S. Appl. No. 11/954,072, mailed Feb. 25, 2011.
Final Office Action from U.S. Appl. No. 11/954,072, mailed Aug. 8, 2011.

* cited by examiner

ALTERNATIVE LOCATION SOURCE FOR LOW-COST INTERNET BASE STATION SYSTEMS WHEN SATELLITE-BASED POSITIONING SYSTEM COVERAGE IS UNAVAILABLE

BACKGROUND

Unless otherwise indicated herein, the materials described in this section are not prior art to the claims and are not admitted to be prior art by inclusion in this section.

1. Cellular Wireless Networks

Many people use mobile stations, such as cell phones and personal digital assistants (PDAs), to communicate with cellular wireless networks. These mobile stations and networks typically communicate with each other over a radio frequency (RF) air interface according to a wireless protocol such as Code Division Multiple Access (CDMA), perhaps in conformance with one or more industry specifications such as IS-95 and IS-2000. Wireless networks that operate according to these specifications are often referred to as "1×RTT networks" (or "1× networks" for short), which stands for "Single Carrier Radio Transmission Technology." Another protocol that may be used is known as Evolution Data Optimized (EV-DO), perhaps in conformance with one or more industry specifications such as IS-856, Release 0 and IS-856, Revision A. Other protocols may be used as well, such as Long-term Evolution (LTE), Global System for Mobile Communications (GSM), Time Division Multiple Access (TDMA), WiMax, and/or any others.

These networks typically provide services such as voice, Short Message Service (SMS) messaging, and packet-data communication, among others, and typically include a plurality of base stations, each of which provide one or more coverage areas, such as cells and sectors. When a mobile station is positioned in one of these coverage areas, the mobile station can communicate over the air interface with the base station, and in turn over one or more circuit-switched and/or packet-switched signaling and/or transport networks to which the base station provides access.

The base stations for these networks are typically not associated with any subscriber or small group of subscribers in particular; rather, they are placed in publicly-accessible locations and are used by the service provider's customers generally. These base stations collectively blanket cities, rural areas, etc. with coverage; as such, they are referred to generally and herein as "macro (or macro network) base stations" and the network they collectively form—or to which they collectively belong—is referred to generally and herein as the "macro network."

Mobile stations and macro base stations conduct communication sessions (e.g., voice calls and data sessions) over frequencies known as carriers, each of which may actually be a pair of frequencies, with the base station transmitting to the mobile station on one of the frequencies, and the mobile station transmitting to the base station on the other. Furthermore, using a sector as an example of a coverage area, macro base stations may provide service in a given sector on one carrier, or on more than one. For example, in a CDMA wireless network, each cell employs one or more carrier frequencies, and each sector is distinguished from adjacent physical sectors by a pseudo-random number offset (PN offset). Further, each sector can concurrently communicate on multiple different channels, distinguished by Walsh codes. When a mobile station operates in a given sector, communications between the mobile station and the macro base station of the sector are carried on a given frequency and are encoded by the sector's PN offset and a given Walsh code.

According to industry standards IS-2000 and IS-95, a mobile station can communicate with a number of "active" sectors concurrently, which collectively make up the mobile station's "active set". Depending on the system, the number of active sectors can be up to six (currently). The mobile station maintains in a memory a list of the sectors in its active set. In practice, the mobile station receives largely the same signal from each of the sectors of its active set and, on a frame-by-frame basis, selects the best signal to use.

2. Low-Cost Internet Base Stations (LCIBs)

Many macro network subscribers, including private consumers and small businesses, among others, in addition to having wireless service for their mobile station (or mobile stations), also have high-speed (a.k.a. "broadband") Internet access through another communication channel, which may be cable-modem service, digital-subscriber-line (DSL) service, satellite-based Internet service, and/or some other option.

In an exemplary arrangement, a user may have a cable modem connected (a) via coaxial cable to a cable provider's network and (b) via Ethernet cable to a wireless (e.g., IEEE 802.11 (Wi-Fi)) router. That router may include one or more Ethernet ports to which computers or other devices may be connected, and may also include wireless-access-point functionality, providing a Wi-Fi packet-data interface to, as examples, laptop computers, digital video recorders (DVRs), appliances, and/or any other computing devices or their wireless network adapters.

To address gaps in macro network coverage (e.g., in buildings) and for other reasons, macro network service providers offer consumers devices referred to herein as Low-Cost Internet Base Stations (LCIBs), which may also be referred to as femtocells (femto base stations, femto base transceiver stations (BTSs)), picocells (pico base stations, pico BTSs), microcells (micro base stations, micro BTSs), small cells, and by other names. Note that the aforementioned terms that end in "cell" may also be generally and herein used interchangeably to refer to the coverage area provided by the respective device. Note also that "low-cost" is not used herein as a limiting term; that is, devices of any cost may be categorized as LCIBs, though most LCIBs typically will be less expensive on average than most macro network base stations.

A typical LCIB may be approximately the size of a desktop phone or Wi-Fi access point, and is essentially a low-power, low-capacity version of a macro base station. Thus, a typical LCIB will use a normal power outlet, perhaps with a transformer providing a DC power supply. The LCIB may have a wired or wireless connection with the user's router, and would thus have connectivity to the Internet and/or one or more other packet-data networks via the user's broadband connection. An LCIB may establish a virtual private network (VPN) connection over the Internet with an entity (e.g., a VPN terminator) on the wireless-service (macro network) provider's core network, and thereby be able to securely communicate with the VPN terminator and other entities on that core network and beyond.

The LCIB also has a wireless communication (e.g., CDMA, EV-DO, LTE) interface that is compatible with the user's mobile station(s), such that the LCIB may act as a micro base station, providing coverage on the wireless-service provider's network via the user's Internet connection. Usually, an LCIB will provide service on a single RF carrier (or on a single carrier per technology, where multiple technologies are supported), and also transmit what is known as a pilot beacon, which includes administrative messages and parameters that mobile stations can use to connect with the LCIB. And LCIBs typically include a satellite-based positioning system (SPS) receiver (e.g., a Global Positioning System (GPS) receiver) for use in receiving and decoding SPS signals, for use in determination of location, as well as for use in synchronizing operations with other LCIBs and with the macro network, based on timing information embedded in SPS signals. Typically, LCIBs have fairly comprehensive auto-configuration capabilities, such that they are largely "plug-and-play" to the user.

Overview

As stated, an LCIB typically includes an SPS receiver that it uses to receive SPS signals, for location and timing (i.e. synchronization), perhaps among other purposes. Upon being powered on, or in response to some other command or triggering event, an LCIB may use its SPS receiver to attempt to obtain an initial SPS fix, which typically involves receiving signals from multiple (e.g., three or four) satellites and using those signals to compute its location. Further, the LCIB may determine its location with the assistance of a network entity such as a position determining entity (PDE). For instance, the LCIB may use its Internet connection to send the data that it receives from the multiple SPS satellites to the PDE, and the PDE may then do the necessary calculations and return a location (e.g., {latitude, longitude}) to the LCIB.

In the example where the LCIB computes or receives an indication of its own location, the LCIB may then—as part of the LCIB's auto-configuration process—use that location to receive authorization to operate in a given location and acquire one or more operating parameters, such as a traffic-bearing carrier frequency (i.e. a carrier), a PN offset, and/or any others. In one example, the LCIB may send a request for configuration information to a network entity, such as an LCIB controller, where the request includes the LCIB's location, perhaps among other values. The LCIB controller may then use that location to determine whether the LCIB is authorized to operate in the location. If the LCIB is authorized to operate in the location, the LCIB controller may identify which carriers are licensed by the service provider in the location in which the LCIB resides. The LCIB controller may then choose a licensed carrier, a PN offset, and/or any other configuration parameters, and send a configuration response to the LCIB over the Internet (i.e., over the VPN connection between a VPN terminator and the LCIB). Thereafter, the LCIB may operate using the operating parameters specified by the LCIB controller.

Unfortunately, the above-described auto-configuration process depends on the LCIB being able to acquire an initial SPS fix. Often, however, an LCIB is deployed in a location that does not receive sufficient SPS reception for this to happen. For example, an LCIB may be deployed in the basement of a home, where the LCIB does not receive sufficient SPS reception for acquiring an initial SPS fix. Alternatively, the LCIB may be deployed in a high-rise building, multiple-dwelling unit, office building, and/or any other situation where the LCIB similarly does not receive sufficient SPS reception to acquire an initial SPS fix. Consequently, an improvement is desired.

Disclosed herein is a method and corresponding system to help overcome this problem. In accordance with the disclosure, an LCIB may engage in air-interface communication with a macro network, similar to the way in which a mobile station engages in air-interface communication with the macro network, such that the macro network assigns the LCIB to operate on a particular active set of one or more particular sectors. For example, the LCIB may communicate an air-interface communication request to the macro network, seeking to engage in bearer communication via the macro network. In response to receiving the request, a macro base station may assign the LCIB an active set of one or more particular sectors, similar to the way in which the macro base station assigns a mobile station to operate on an active set.

To determine its location, the LCIB may then communicate data indicating the particular active set to a server over a backhaul connection to the macro network. Advantageously, because the particular sector(s) of an active set that the LCIB is assigned to operate on may vary depending on the location of the LCIB, the server may estimate a location of the LCIB by determining a geographic location corresponding to the particular active set. By way of example, the server may be configured to access a database of information that correlates active sets to geographic locations to determine a geographic location corresponding to the particular active set. The server may then send the determined location of the LCIB to the LCIB and/or an LCIB controller. Alternatively, the server may determine whether the LCIB is authorized to operate in the determined location and, if so, provide the LCIB with one or more operating parameters. Thus, the LCIB can request authorization to operate in a particular location and receive operational status even in a situation where the LCIB does not include an SPS receiver or is implemented in a location where the LCIB does not receive a sufficient SPS signal to determine its own location.

Accordingly, in one respect, disclosed is a method that may be implemented by an LCIB. The disclosed method may involve the LCIB engaging in communication with a macro network using a wireless communication interface, such that the macro network assigns the LCIB to operate as a mobile station on a particular active set of one or more particular sectors. Further, the method may involve the LCIB transmitting data indicative of the particular active set to the macro network using a backhaul connection to the macro network. The method may then involve, responsive to the LCIB transmitting the data indicative of the particular active set to the macro network, the LCIB receiving a location corresponding to the particular active set from the macro network via the backhaul connection to the macro network.

In another respect, disclosed is an LCIB. The LCIB may include a wireless communication interface, a backhaul connection to a macro network, a processor, and data storage comprising instructions executable by the processor. The instructions may be executable by the processor to: (i) establish connectivity with the macro network using the wireless communication interface, such that the macro network assigns the LCIB to operate as a mobile station on a particular active set of one or more particular sectors, (ii) transmit data indicative of the particular active set to the macro network over the backhaul connection to the macro network, and (iii) in response to transmitting the data indicative of the particular active set to the macro network, receive over the backhaul connection to the macro network a location corresponding to the particular active set.

Further, in still another respect, disclosed is a server. The server may include a network communication interface to a macro network, a processor, and data storage comprising instructions executable by the processor. The instructions may be executable by the processor to: (i) receive via the network communication interface and from an LCIB data indicative of a particular active set of one or more particular sectors of the macro network, and (ii) responsive to receiving the data indicative of the particular active set, determine a location of the LCIB based at least in part on the particular active set.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

For illustration, portions of the present method will be described with respect to communications of the CDMA2000 family (e.g., 1×Advanced). It should be understood, however, that part or all of the method may apply equally to other air-interface protocols in which mobile stations are assigned to operate on active sets.

1. Example Communication System

Referring to the drawings, as noted above, FIG. 1A is a simplified block diagram of an example communication system 100, in accordance with exemplary embodiments. It should be understood that this and other arrangements described herein are set forth only as examples. As such, those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Figure 1A:
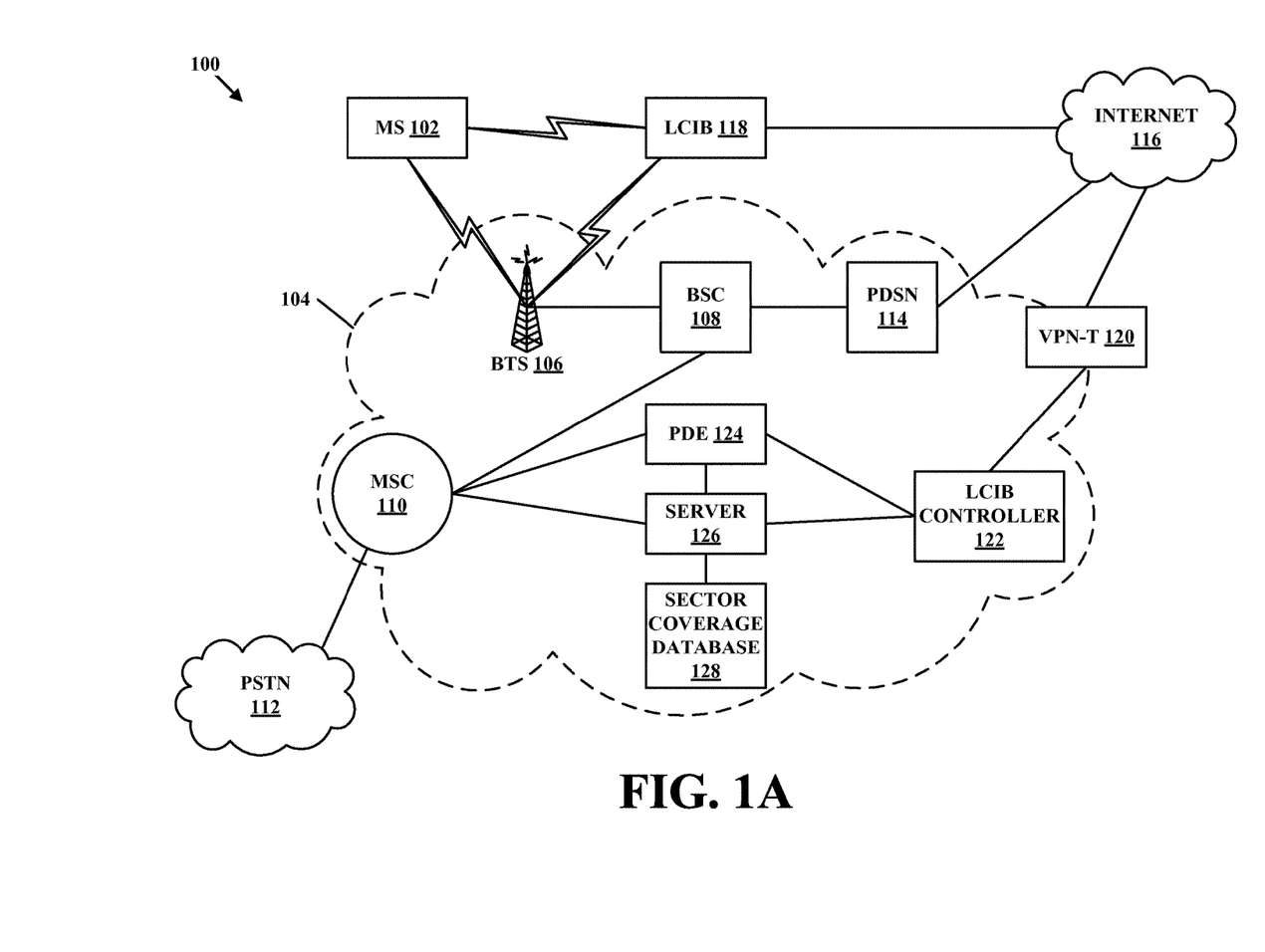
FIG. 1A is a simplified block diagram of an example communication system, in accordance with exemplary embodiments.

As shown in FIG. 1A, the communication system 100 includes a representative mobile station (MS) 102 in communication with a service provider network 104. Mobile station 102 may be any device arranged to carry out the mobile station functions described herein. Notwithstanding their title, these devices need not be movable but are considered to be "mobile" because they can engage in cellular wireless communication at various locations. As examples, mobile station 102 could be or include a cell phone, a PDA, a tablet, a computer, a laptop computer, and/or a multi-mode cellular/Wi-Fi device.

Mobile station 102 may include a user interface, a wireless communication interface, a location interface such as an SPS-enabled chipset, a processor, and data storage comprising instructions executable by the processor for carrying out those mobile station functions. The user interface may include buttons, a touch-screen, a microphone, and/or any other elements for receiving inputs, as well as a speaker, one or more displays, and/or any other elements for communicating outputs. The wireless communication interface may include an antenna and a modem chipset suitable for communicating with one or more macro base stations, LCIBs, and/or other devices over suitable air interfaces. The SPS-enabled chipset, processor, and data storage may be any suitable components known to those in the art. In some instances, the wireless communication interface may also include the SPS-enabled chipset and/or other location module(s).

As further shown in FIG. 1A, service provider network 104 includes a BTS 106, a base station controller (BSC) 108, and a mobile switching center (MSC) 110. BTS 106 may radiate to provide one or more coverage areas, such as cells and sectors, for communicating with mobile stations over an air interface. BTS 106 is shown coupled with BSC 108, which may function to control various BTS operations as well as aspects of air-interface operation such as handoff of calls between coverage areas. Note that the combination of BTS 106 and BSC 108 may be considered a macro base station. However, BTS 106 or BSC 108 could, taken alone, be considered a macro base station as well. Further, the macro base stations of the service provider network 104 collectively form a macro network.

BSC 108 is then shown coupled with MSC 110, which provides connectivity with the public switched telephone network (PSTN) 112, and BSC 108 is further shown coupled with a packet data serving node (PDSN) 114, which provides connectivity with the Internet 116. With this arrangement, mobile station 102 may engage in air-interface communication with BTS 106, and may thereby communicate via the BTS with various network entities on the service provider network 106, PSTN 112, PDSN 114, or Internet 116 or with other mobile stations served by the BTS 106.

An LCIB 118 is also shown in the communication system 100 of FIG. 1A. LCIB 118 may be any computing and communication device arranged to carry out the LCIB functions described herein. As such, LCIB 118 may include one or more communication interfaces, a processor, and data storage comprising instructions executable by the processor for carrying out those LCIB functions. The one or more communication interfaces may include a wireless interface for communicating with one or more mobile stations according to an air-interface protocol. LCIB 118 may also have an SPS receiver and/or other location module.

Additionally, the one or more communication interfaces of LCIB 118 may include an Ethernet or Wi-Fi interface for communicating with the Internet 118 via a device such as a router and/or cable modem. In some instances, LCIB 118 may securely communicate with devices on service provider network 104 via Internet 116 and VPN terminator 120. In general, VPN terminator 120 functions to establish secure VPN connections with LCIB 118, enabling LCIB 118 to securely communicate with devices on service provider network 104 over Internet 116. For example, LCIB 118 may securely communicate with LCIB controller 122 via VPN terminator 120.

LCIB controller 122 may be any networking element arranged to carry out the LCIB controller functions described herein. Thus, LCIB controller 122 may include a communication interface, a processor, and data storage comprising instructions executable by the processor for carrying out those LCIB controller functions. The communication interface may include one or more wired and/or wireless interfaces for communicating with at least VPN terminator 120, as well as perhaps one or more other entities on service provider network 104. Among other functions, LCIB controller 122 communicates via VPN terminator 120 with LCIBs such as LCIB 118. In some examples, LCIB controller 122 may receive requests from various LCIBs for configuration data, and those requests may include, among other values, indications of the LCIBs' respective locations. LCIB controller 122 may also be operable to select various operating parameters for LCIBs (e.g., carrier, PN offset, whether to broadcast a pilot-beacon, contents of any pilot beacon to be broadcast, transmission-power level), and to transmit those parameters to LCIBs, perhaps along with other configuration data and messaging.

Service provider network 104 further includes a position determining entity 124. PDE 124 may be any networking element arranged to carry out the PDE functions described herein. Thus, PDE 124 may include a communication interface, a processor, and data storage comprising instructions executable by the processor for carrying out those PDE functions. The communication interface may include one or more wired and/or wireless interfaces for communicating with at least MSC 110 and LCIB controller 122, along with perhaps one or more other entities on service provider network.

In one example, PDE 124 may function to determine a location of a mobile station and/or LCIB. For instance, a mobile station or LCIB may receive data from one or more SPS satellites and send a request to PDE 124 that includes the received data. PDE 124 may use this data to compute a location, and return the location to the requesting device. PDE 124 may also store the determined location on PDE 124, LCIB controller 122, and/or one or more other network entities. In other examples, PDE 124 may assist devices such as mobile stations and LCIBs in computing their own location, by providing GPS assistance data to those devices.

In accordance with the present disclosure, LCIB 118 may also engage in air-interface communication with BTS 106, and may thereby communicate via the BTS with various network entities on the service provider network 106, PSTN 112, PDSN 114, or Internet 116. LCIB 118 may function similar to a mobile station when communicating with the BTS 106. For example, LCIB 118 may further include an antenna and a modem chipset of the type that would be included in a mobile station, such as mobile station 102. Thus, LCIB 118 may communicate with one or more macro base stations using the antenna and modem chipset.

By way of example, LCIB 118 may communicate an air-interface communication request to the service provider network 104, seeking to engage in bearer communication via a macro network of the service provider network 104. In response to receiving the request, BSC 108 may assign LCIB 118 an active set of one or more particular sectors. Thus, the macro network may assign the LCIB a particular active set, similar to the way that the macro network assigns active sets to mobile stations.

In practice, to facilitate a determination of which sectors should be in an LCIB's active set, BTSs of the macro network emit a pilot channel signal, typically at a power level higher than other network signals. The LCIB, acting as a mobile station, measures the strength (e.g., $E_c/I_o$–energy versus spectral density) of each pilot that it receives and notifies a primary base station (a base station currently serving the LCIB) when pilot signal strength falls above or below defined thresholds. The base station, in turn, provides the LCIB with an updated list of active pilots. More particularly, according to IS-2000, the base station provides the LCIB with a Handoff Direction Message (HDM), which indicates (i) the PN offsets of the sectors in the active set and (ii) handoff parameters that relate to pilot signal strength.

Because the strength of each pilot that the LCIB receives may vary depending on the location of the LCIB, a particular active set that the LCIB is assigned to operate on may correspond to a particular location. For example, a given active set may correspond to a geographic area in which the LCIB can receive pilot signals, which are above a defined threshold, from particular BTS(s). Advantageously, a server 126 of the macro network may be configured to access a database of information to determine a geographic location corresponding to the particular active set, thereby determining a location of the LCIB.

Specifically, server 126 may have access to, and optionally maintain, sector coverage database 128, which indicates information that can be used to correlate active sets to geographic locations. For instance, sector coverage database 128 may be a database that indicates geographic locations that correspond to one or a combination of particular sectors defined by one or more BTSs.

Sector coverage database 128 can take any of a variety of forms, the details of which are not critical. By way of example, the sector database 128 can include a table in which each record has a "Location" field and a "Sector(s)" field. The Location field can indicate a geographic location (such as latitude/longitude coordinates) or a range of geographic locations (such as a range of latitude/longitude coordinates). The Sector(s) field can then indicate one or more sectors that encompass the location indicated in the Location field. Each sector can be identified by a BTS identification (BTSID) code and a sector phase (e.g., 1, 2, or 3), or by a BTSID code and a PN offset, or in any other manner desired.

Additionally, sector coverage database 128 can be populated with values through any of a variety of procedures, the details of which are not critical. The contents of sector coverage database 128 can also be updated as desired by server 126. By way of example, each of a plurality of mobile stations, such as mobile station 102, may report their respective location (such as latitude/longitude coordinates) as well as an active set of one or more particular sectors that the macro network assigns the mobile station to operate on at the location. For instance, a mobile station may periodically report its location and a corresponding active set to server 126 or the mobile station may report its location and the corresponding active set to server 126 in response to receiving a request from the server 126 or another network entity. Server 126 may then update the information stored in the sector coverage database 128 using the reported location and active set.

In another example, when a BSC, such as BSC 108, assigns a mobile station to operate on a particular active set, the BSC may determine the location of the mobile station. The process of determining the location may involve simply receiving an indication of the location from the mobile station. For instance, if the mobile station is equipped with an SPS-enabled chipset, the mobile station can determine and report its current location to the BSC. Alternatively, the BSC may query a mobile positioning center (MPC) to identify the location of the mobile station. The BSC may then report the particular active set and a location of the mobile station to server 126 by way of MSC 108. As still another example, a mobile station may be configured to log location information and corresponding active sets in a memory of the mobile station and to upload the log to server 126 from time to time.

Server 126 may be any network element arranged to carry out the server functions described herein. Thus, server 126 may include a communication interface, a processor, and data storage comprising instructions executable by the processor for carrying out those server functions. In one example, server 126 may function to determine a location of an LCIB, and optionally, to facilitate registering the LCIB with the macro network. For instance, LCIB 118 may send to server 126 a request for assistance with determining its location and may include in the request data indicating a particular active set that LCIB 118 is assigned to operate on as a mobile station. Server 126 may then use this data to compute a location, and return that location to LCIB 118. Alternatively, instead of or in addition to returning the determined location to LCIB 118, server 126 may send the determined location to LCIB controller 122 such that LCIB controller 122 may determine whether LCIB 118 is authorized to operate in the determined location. In still another example, server 126 may be a component of LCIB controller 122. For instance, server 126 and LCIB controller 122 may be a single network element (not shown). In such an example, server 126 may therefore further be configured to determine whether the LCIB 118 is authorized to operate in the determined location.

In one instance, in response to receiving data indicating an active set, server 126 may identify which particular sector(s) are in the active set, and perform a data lookup keyed to the identified sector(s). For example, server 126 may access a table stored in sector coverage database 128 that relates geographic locations to particular sectors or combinations of sectors. Given the particular sector(s) of the active set, server 126 may thus identify a particular geographic location corresponding to the particular sector(s). If there is only a single sector in the active set, server 126 may identify a geographic location associated with the single sector. If there are multiple sectors in the active set, the server 126 may identify a geographic location corresponding to the particular combination of multiple sectors. Additionally, if the geographic location corresponding to a particular active set is a geographic area, server 126 may then determine a centroid or other representation of the geographic area and deem the location to be the centroid or other representation. Finally, server 126 may transmit data indicating the determined location to LCIB 118 and/or LCIB controller 122. For instance, server 126 may send the data indicating the determined location to LCIB 118 via VPN terminator 120 and the Internet 116.

The determined location could be used by the LCIB 118, LCIB controller 122, and/or server 126 for various purposes. For instance, LCIB 118 may use the location to acquire and/or confirm one or more operating parameters. By way of example, LCIB 118 or server 126 may send to the LICB controller 122 a request for configuration information, including the received location. LCIB controller 122 may then use that location to determine whether LCIB 118 is authorized to operate in the location and identify which carriers are licensed by the service provider in the location in which LCIB 118 resides. If LCIB 118 is authorized to operate in the location, LCIB controller 122 may then choose a licensed carrier, a PN offset, and/or any other configuration parameters, and send a configuration response to LCIB 118. As discussed above, alternatively, server 126 may function to carry out these functions. That is, server 126 may use the determined location to determine whether LCIB 118 is authorized to operate in the location, and if LCIB 118 is authorized, to determine and send the configuration parameters to LCIB 118. In turn, LCIB 118 may operate using the operating parameters specified by LCIB controller 122.

In another example, LCIB 118 and/or another entity of the service provider network 104 may also use the received location for E911 purposes. Other examples are possible as well.

Figure 1B:
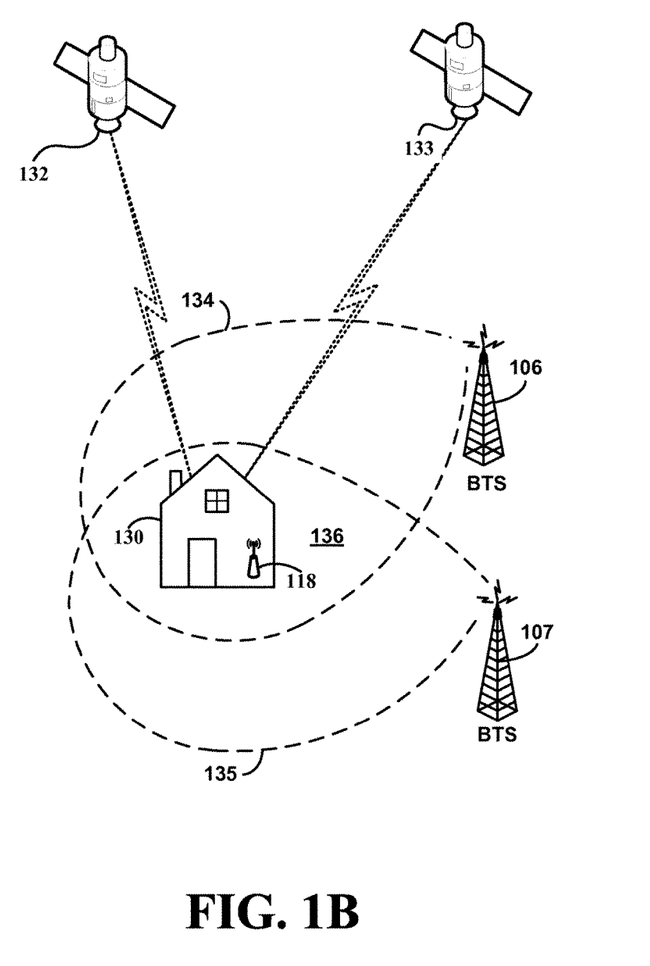
FIG. 1B is an example representation of an arrangement of communication entities in which exemplary embodiments can be advantageously employed.

Turning now to FIG. 1B, FIG. 1B depicts an example representation of an arrangement of communication entities in which exemplary embodiments can be advantageously employed. Note that the representation shown in FIG. 1B is by way of example and not by way of limitation. Additional and/or different elements could be present in a given scenario, without departing from the invention.

More particularly, FIG. 1B depicts, BTS 106 and LCIB 118, as well as a BTS 107, a building 130, two SPS satellites 132, 133 deployed in orbit, and two coverage areas 134, 135.

As shown in FIG. 1B, LCIB 118 may be deployed inside building 130. In the scenario depicted in FIG. 1B, it could well be the case that LCIB 118 can only faintly detect a signal from one of SPS satellites 132, 133. However, LCIB 118, when situated inside building 130, can communicate with BTS 106 and BTS 107 over an air interface. For instance, LCIB 118 is depicted as being located within coverage area 134 of BTS 106 as well as within coverage area 135 of BTS 107. Specifically, LCIB 118 is depicted as being located within an area 136 where coverage areas 134 and 135 overlap. Each of coverage areas 134, 135 may be a particular sector. That is, coverage area 134 may be a first sector which BTS 106 provides and coverage area 135 may be a second sector which BTS 107 provides.

LCIB 118 and BTSs 106, 107 can communicate over a CDMA air interface, though any other wireless technology could be used. In an example scenario, LCIB 118 may register with service provider network 104 via BTS 106 or BTS 107 and operate in what is known as "idle mode" on a carrier frequency in a coverage area provided by that BTS. While in the "idle mode", LCIB 118 may send an access-request message in order to request and establish communication on a traffic channel. In response to receiving the access-request message, a macro base station may establish a radio link and allocate a traffic channel for use by LCIB 118. After the macro base station has established the radio link and allocated the traffic channel, LCIB 118 is said to be operating in what is known as an "active mode" or "connected mode".

Further, while LCIB 118 is being served in an active mode, LCIB 118 may report pilot strengths to the macro base station, and the macro base station may assign LCIB 118 to operate on a particular active set. By way of example, LCIB 118 may receive pilot signals from each of BTS 106 and BTS 107, and report to one of BTS 106 and BTS 107a pilot signal strength of each of the pilot signals. As a result, one of BTS 106 and BTS 107 may assign LCIB 118 to operate on an active set in accordance with the reported strengths and one or more threshold conditions. For instance, if each of the reported strengths is above a defined threshold, BTS 106 may assign LCIB 118 to operate on a particular active set that includes coverage area 134 and coverage area 135.

2. Example Operation

Figure 2:
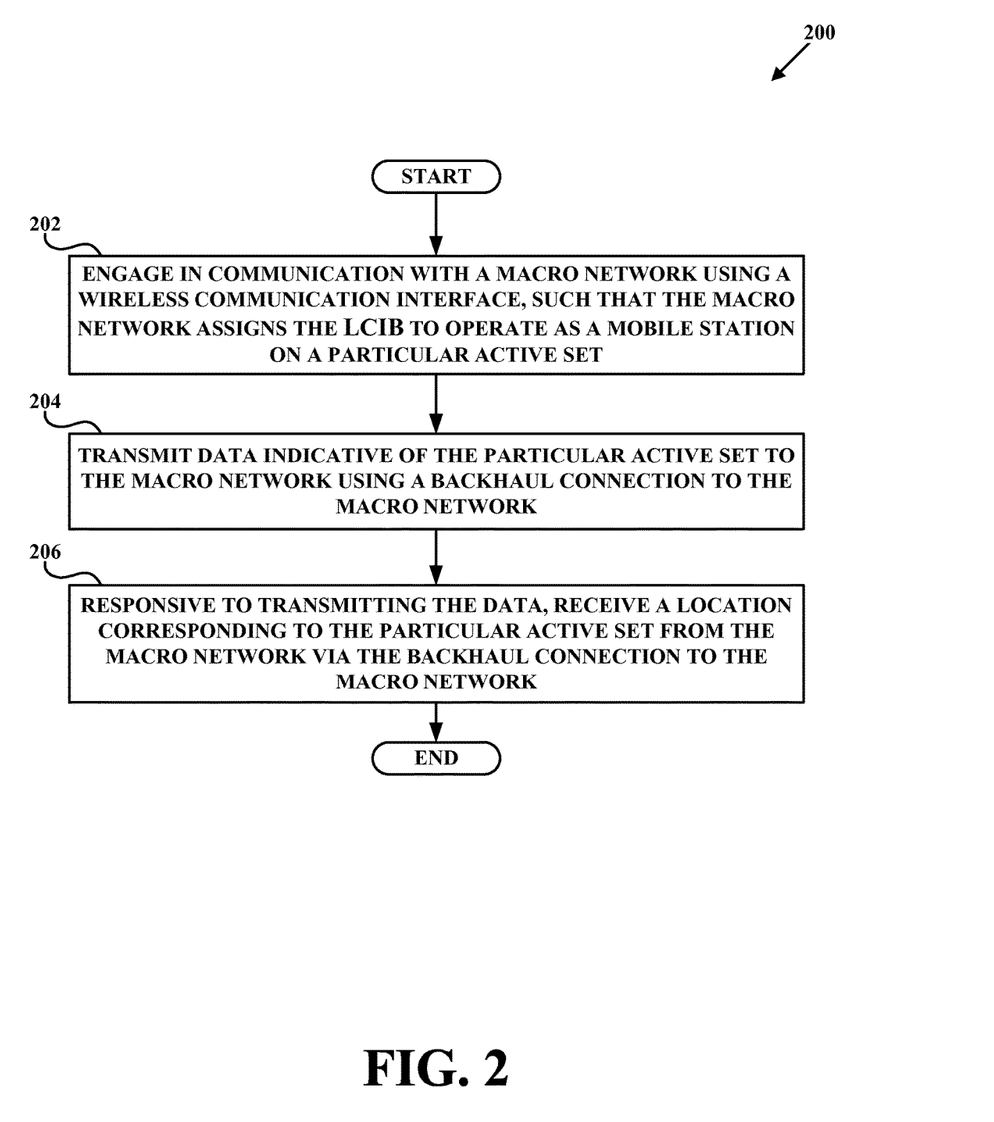
FIG. 2 is a flow chart depicting functions that may be employed in accordance with exemplary embodiments.

FIG. 2 is a flow chart depicting functions that may be employed in accordance with exemplary embodiments. In particular, FIG. 2 depicts a method 200 that may be carried out by an LCIB, such as LCIB 118. In one example, the method 400 may be carried out by LCIB 118 in the example representation described above in connection with FIG. 1B.

As shown in FIG. 2, at block 202, the method 200 may involve engaging in communication with a macro network using a wireless communication interface, such that the macro network assigns the LCIB to operate as a mobile station on a particular active set. In one example, the LCIB may function as a mobile station to engage in communication with a base station of the macro network. For instance, the LCIB may use the wireless communication interface to engage in air-interface communication with the base station.

In practice, while the LCIB is being served by the macro network in an active mode, the LCIB may scan for available pilot signals broadcast by one or more base stations of the macro network. For example, the LCIB may scan for the available pilot signals using a modem chipset and an antenna. The LCIB may report the received signal strengths associated with any available pilot signals to the base station (e.g., in a Pilot Strength Measurement Message (PSMM)), and the base station may in turn direct the LCIB to update or create its active set in accordance with the reported strengths and one or more threshold conditions. Further, the LCIB may maintain the active set in its memory, with each active sector being identified according to its PN offset, for example.

Further, the LCIB may be configured to engage in communication with the macro network in response to the LCIB failing to acquire an SPS fix. As discussed above, an LCIB typically has an SPS receiver that the LCIB uses to receive SPS signals for location-determination purposes. Upon being powered on, or in response to some other command or triggering event, the LCIB may use its SPS receiver to attempt to obtain an initial SPS fix. Such a process may usually involving receiving signals from multiple (e.g., three or four) satellites, and determining a location based on the received signals. As discussed above, however, the LCIB may be deployed in a location that does not receive sufficient SPS reception for the location determination. Advantageously, as part of the method 200, if the LCIB detects that it is not receiving a sufficient SPS signal for acquiring an initial SPS fix, the LCIB may responsively engage in communication with the macro network using the wireless communication interface. For example, if the LCIB does not detect more than a threshold number of satellite signals within a predetermined amount of time while attempting to acquire an initial SPS fix, the LCIB may power on its modem chipset and antenna and register with the macro network as a mobile station using the modem chipset and antenna. As a result, the macro network may assign the mobile station to operate on a particular active set of one or more particular sectors.

In another example, an LCIB may be programmed or otherwise configured to automatically engage in communication with the macro network using the wireless communication interface in response to being powered on. For instance, an owner or operator of the LCIB may modify a setting of the LCIB that causes the LCIB to carry out the method 200 to facilitate location determination instead of determining a location of the LCIB using its SPS receiver.

Continuing with FIG. 2, at block 204, the method 200 may involve transmitting data indicative of the particular active set to the macro network using a backhaul connection to the macro network. For instance, upon the LCIB receiving its active set, the LCIB may responsively transmit data indicative of one or more particular sectors of the particular active set to a server of the macro network using a VPN connection. By way of example, LCIB 118 may send information identifying the one or more particular sectors to server 126 over Internet 116 using a VPN connection between the LCIB 118 and VPN terminator 120. The server 126 may then determine a geographic location corresponding to the particular active set, by performing a data lookup to map the received data to a location corresponding to the active set, for example.

At block 206, the method 200 may involve responsive to transmitting the data, receiving a location corresponding to the particular active set from the macro network via the backhaul connection to the macro network. For instance, the LCIB may receive the location corresponding to the particular active set from server 126. In one example, the location corresponding to the active set may be a geographic position that is specified by a latitude/longitude coordinate pair. In another example, the location may be a zipcode. Other examples are possible as well.

The determined location could then be used by the LCIB 118 for various purposes. As one example, upon receiving the data indicating the location corresponding to the particular active set, the LCIB may register with the macro network using the received location as its location. For instance, the LCIB may use the received location to acquire and/or confirm one or more operating parameters, such as traffic-bearing carrier frequency (i.e. carrier), a PN offset, and/or any others.

Figure 3:
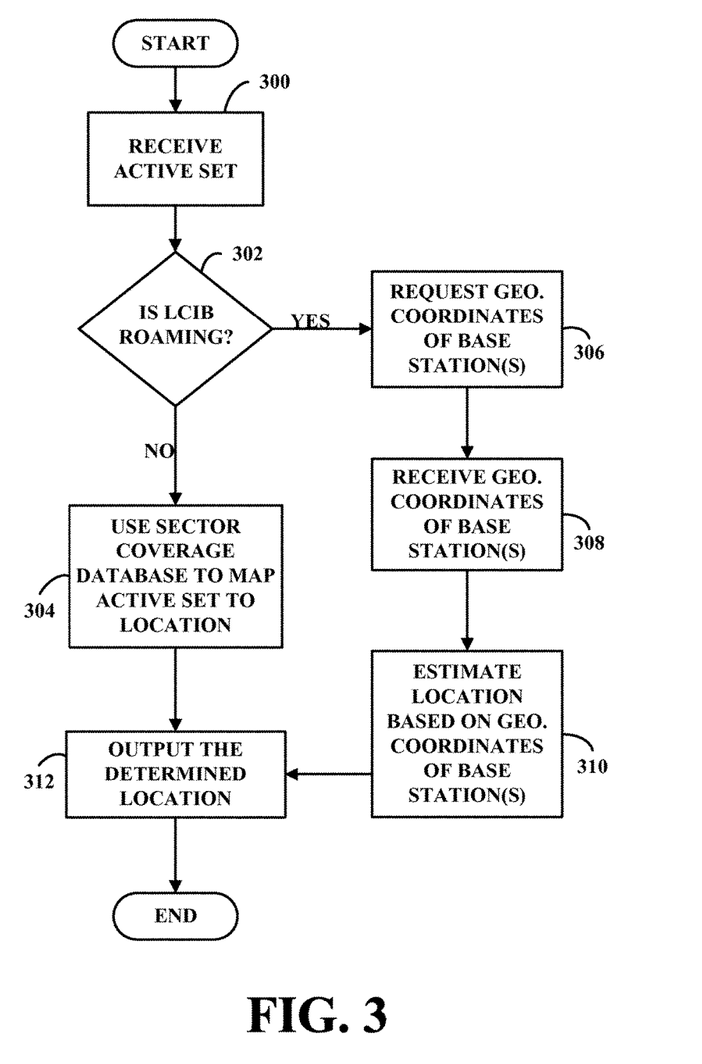
FIG. 3 is another flow chart depicting functions that may be employed in accordance with exemplary embodiments.

FIG. 3 is another flow chart depicting functions that may be employed in accordance with exemplary embodiments. In particular, FIG. 3 depicts a method that may be carried out by a server, such as server 126. Alternatively, one or more functions of the method 300 may be carried out by one or a combination of other components, such as a BSC, MSC, PDE, LCIB controller, or other network entity.

As shown in FIG. 3, at block 300, a server may receive via a network communication interface and from an LCIB data indicative of a particular active set. In one example, the particular active set may be an active set of one or more particular sectors of a macro network. For instance, the active set may be an active set assigned by a macro base station of the macro network.

At block 302, the server may determine whether the LCIB is roaming. In one example, the LCIB may be registered with a primary service provider network. However, when the LCIB is deployed in a multiple service provider environment and the LCIB is operating in an area in which the primary service provider network does not provide coverage, the LCIB may obtain service form another service provider network by functioning as a mobile station and engaging in communication with base stations of the other service provider network. When the LCIB engages in communication with and obtains service from another provider network, the LCIB is said to be roaming.

In practice, the server may determine whether the LCIB is roaming by using one or more of various techniques. As an example, the server may determine whether the particular active set is indicative that the LCIB is roaming by comparing the one or more particular sectors to a list of sectors of the macro network. Alternatively, the server may determine whether the LCIB is roaming based on additional information that is received from the LCIB. For example, the LCIB may be configured to compare a system identification number (SID) broadcast by a base station that it is engaging in communication with to an SID stored in the LCIB. Based on the comparison, the LCIB may transmit information indicative of whether it is roaming to the server. As an example, if the SID broadcast by the base station does not agree with the SID stored in the LCIB, the LCIB may determine that it is roaming and include information identifying the fact that it is roaming in the data transmitted to the server. Other examples are possible as well.

Continuing with FIG. 3, if the server determines that the LCIB is not roaming, at block 304, the server may use the sector coverage database to map the particular active set to a location. In one example, the server may identify which particular sector(s) are in the active set, and perform a data lookup keyed to the identified sector(s). For instance, the server may access a table stored in the sector coverage database that relates geographic locations to particular sectors or combinations of sectors. Given the particular sector(s) of the active set, the server may thus identify a particular geographic location corresponding to the particular sector(s). Additionally, if the geographic location corresponding to the particular active set is a geographic area, the server may then determine a centroid or other representation of the geographic area and deem the location to be the centroid or other representation.

Alternatively, in response to the server making a determination that the LCIB is roaming, at block 306, the server may request geographic coordinates of any base stations serving the LCIB. In some examples, a base station serving the LCIB may report latitude/longitude coordinates of a location of the base station to the LCIB. The LCIB may then send data indicative of the geographic coordinates to the server in response to receiving the request from the server, and at block 308, the server may receive the geographic coordinates via the network communication interface.

At block 310, the server may estimate a location of the LCIB based on the received geographic coordinates. In an example in which the LCIB is only being served by a single base station, such that the LCIB only reported the geographic coordinates of the single base station, the server may use the geographic coordinates as the estimate of the location of the LCIB. In an example in which the LCIB is being served by multiple base stations, such that the LCIB reported the geographic coordinates of multiple base stations, the server may determine a centroid of the respective geographic coordinates. The server may then use the centroid of the respective geographic coordinates as the estimate of the location of the LCIB.

And at block 312, the server may output the determined location to the LCIB. As an example, the server may send the determined location to the LCIB and/or an LCIB controller via the network communication interface. Therefore, regardless of whether the LCIB is an area in which a primary service provider network provides coverage or an area in which another service provider network provides coverage, as long as the LCIB is able to function as a mobile station and engage in communication with a base station, the server may be able to estimate a location of the LCIB.

Figure 4:
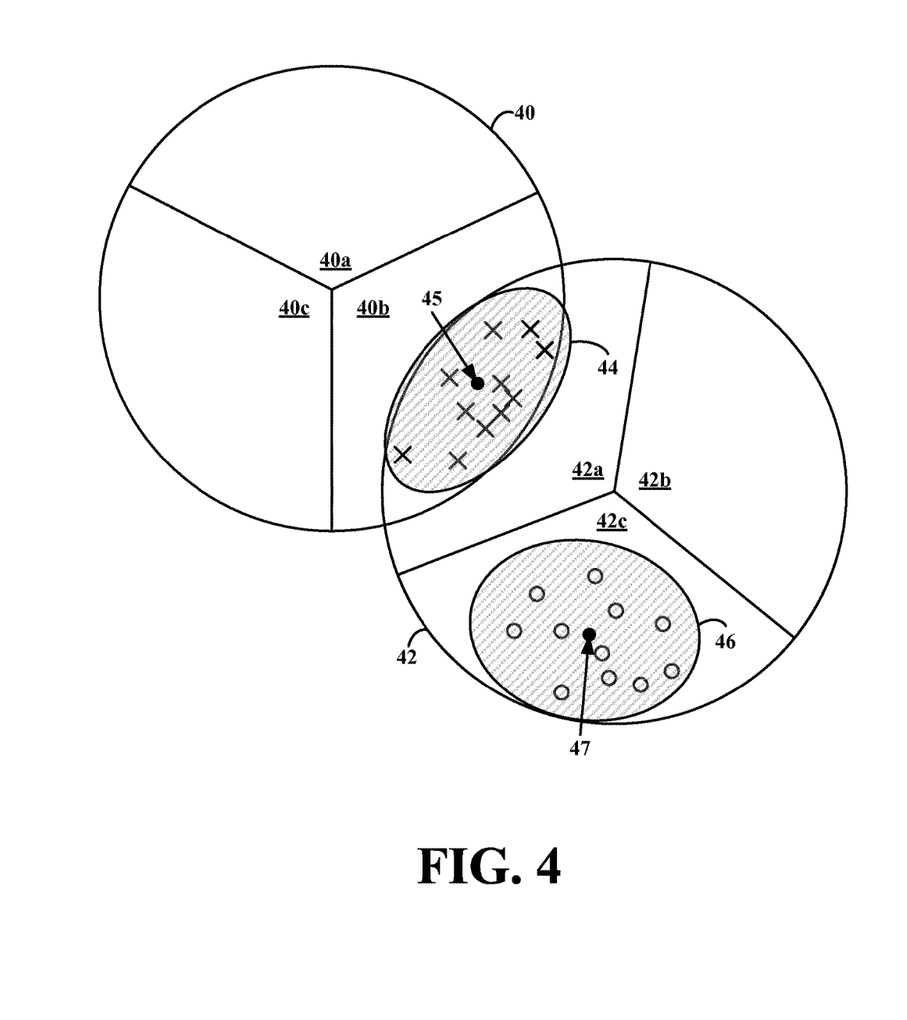
FIG. 4 is an idealized representation of geographic locations corresponding to active sets, in accordance with exemplary embodiments.

FIG. 4 shows an idealized arrangement of two cells 40 and 42 of a macro network. By way of example, cell 40 is shown to include sectors 40a, 40b, and 40c, and cell 42 is shown to include sectors 42a, 42b, and 42c. The boundaries of the cells and sectors are shown in idealized form for purposes of illustration. Further, each cell is served by a respective BTS (not shown).

A mobile station may be located within one or more of these sectors and may be assigned to operate on a particular active set in accordance with pilot signal strengths that are measured by the mobile station. For instance, if a mobile station is located in only sector 42c such that only a pilot signal strength of a pilot signal associated with sector 42c is above a defined threshold, the active set of the mobile station may include the sector 42c. As another example, if a mobile station is located in both sector 40b and 42a and reports pilot signal strengths associated with pilot signals from each of sector 40b and 42a that are above a defined threshold, the active set of the mobile station may include both sector 40b and 42a.

The server or other network entity may be configured to receive data indicative of one or more sectors of the macro network that a mobile station reports being in coverage of and/or is assigned to operate on at a location. As an example, each "x" shown in FIG. 4 represents a location of a mobile station that reported being in coverage of both sectors 40b and 42a. Similarly, each "o" shown in FIG. 4 represents a location of a mobile station that reported being in coverage of only sector 42c.

Given the data indicative of the locations of the mobile stations and the associated sector(s), the server (or another network entity) may be configured to derive a geographic area associated with particular active sets using one or more various techniques. For example, the server may determine geographic coordinates of an area 44 that encompasses each of the locations of mobile stations that reported being in coverage of both sectors 42a and 40b. Further, the server may determine a centroid 45 of the area 44. Similarly, the server may determine geographic coordinates of an area 46 that encompasses each of the locations of mobile stations that reported being in coverage of only sector 42c, as well as a centroid 47 of the area 46.

Again, however, the areas 44 and 46 are shown for purposes of illustration and meant to be examples. In other instances, different-shaped areas or areas that do not include each reported location may be determined. Moreover, the values of the sector coverage database may be established using other techniques instead of or in addition to the technique described above with reference to FIG. 4. For example, techniques such as testing pilot signal strengths using mobile test sets to determine which geographic positions fall within which sector(s) or using software simulations to model BTS sector boundaries are contemplated.

3. Example LCIB

Figure 5:
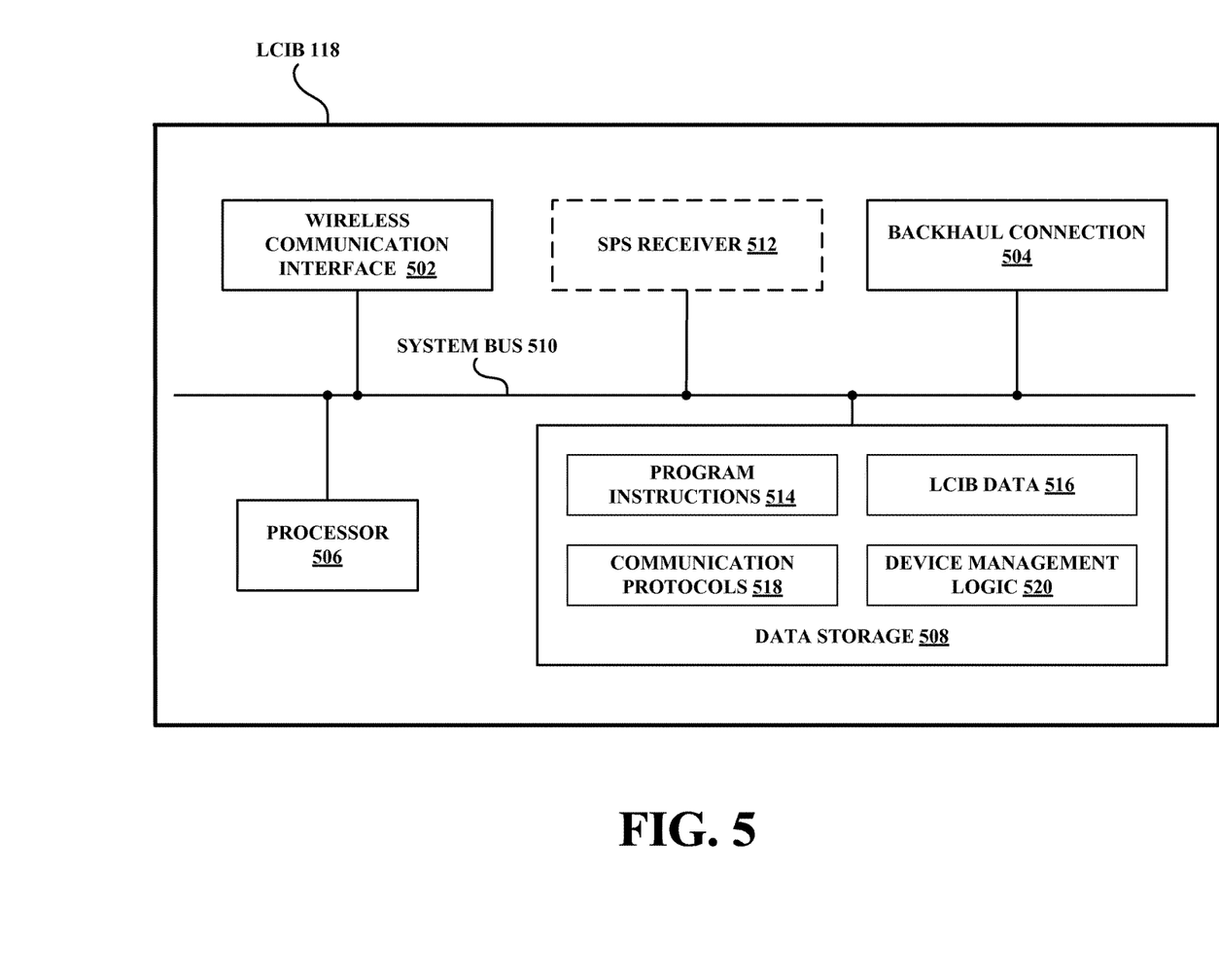
FIG. 5 is a simplified block diagram of an example LCIB, in accordance with exemplary embodiments.

FIG. 5 is a simplified block diagram of an example LCIB 118. As shown in FIG. 5, the example LCIB 118 includes a wireless communication interface 502, a backhaul connection 504 to a macro network, a processor 506, and data storage 508, all communicatively linked by a system bus 510. Optionally, the LCIB may also include an SPS receiver 512. Note that LCIB 118 could have additional and/or different components, and that this structure is provided by way of example.

Wireless communication interface 502 may include one or more antennas, one or more chipsets, a set of one or more channel elements, and/or one or more other components suitable for providing a wireless coverage area according to a wireless communication protocol such as CDMA, LTE, and/or one or more other technologies. Additionally, the wireless communication interface may include one or more antennas, one or more chipsets, and/or one or more other components, which may be the same components or different components than those described above, for engaging in communication with a macro network and operating as a mobile station.

Backhaul connection 504 may provide a wired packet-data interface for communicating with a device such as a router or cable modem. Processor 506 may comprise multiple (e.g., parallel) processors, such as a general microprocessor and/or a discrete digital signal processor. The data storage 508 may take various forms, in one or more parts, such as a non-volatile storage block and/or a removable storage medium, and may include (a) program instructions 514 executable by processor 506 for carrying out the LCIB functions described herein, (b) LCIB data 516, which may be any operational data or other type of data stored for use by LCIB 118, (c) communication protocols 518, facilitating and enabling communication with one or more other devices, and (d) device management logic 520, perhaps for memory and file management.

SPS receiver 512 may be any known or hereafter-developed SPS receiver, suitable for receiving and decoding SPS signals for location and timing purposes, perhaps among other purposes. In some embodiments, an LCIB may have a location module in addition to or instead of an SPS receiver.

4. Example Server

Figure 6:
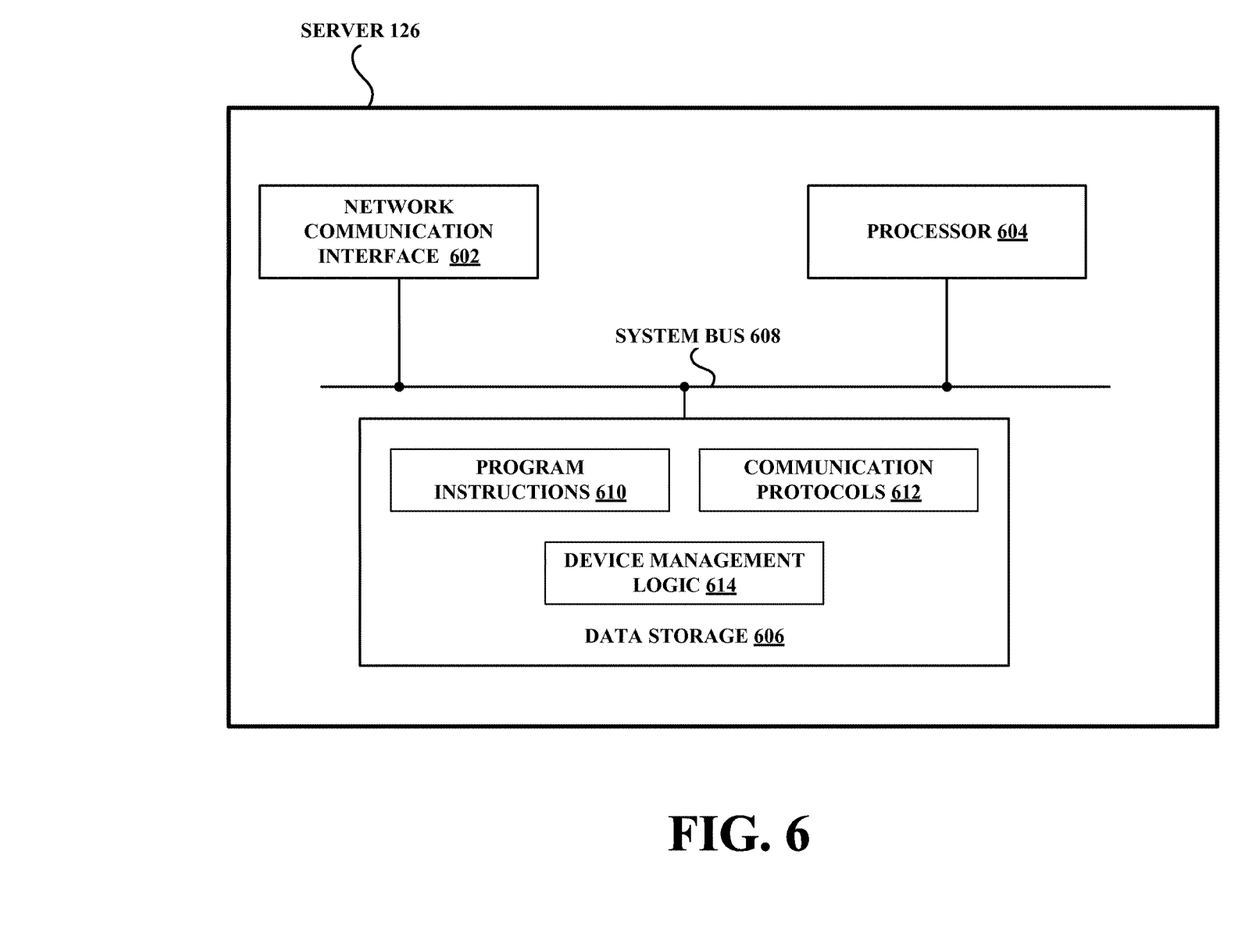
FIG. 6 is a simplified block diagram of an example server, in accordance with exemplary embodiments.

FIG. 6 is a simplified block diagram of an example server 126. As shown in FIG. 6, the example server 126 includes a network communication interface 602, a processor 604, and data storage 606, all communicatively linked by a system bus 608. Note that server 126 could have additional and/or different components, and that this structure is provided by way of example.

Network communication interface 602 may include a wireless and/or wired packet-data interface for communicating with a device such as LCIB 118 by way of one or more network entities. For example, server 126 may send data to LCIB 118 or receive data originating from LCIB 118 using the network communication interface 602, VPN terminator 120, and Internet 116. Processor 604 may comprise multiple (e.g., parallel) processors, such as a general microprocessor and/or a discrete digital signal processor.

The data storage 606 may take various forms, in one or more parts, such as a non-volatile storage block and/or a removable storage medium, and may include (a) program instructions 610 executable by processor 604 for carrying out the server functions described herein, (b) communication protocols 612, facilitating and enabling communication with one or more other devices, and (c) device management logic 614, perhaps for memory and file management.

5. Conclusion

Various exemplary embodiments have been described above. Those of ordinary skill in the art will appreciate, however, that changes from the embodiments are possible, while remaining within the scope of the claims.

We claim:

1. A method implemented by a low-cost Internet base station (LCIB), the method comprising:
the LCIB engaging in communication with a macro network using a wireless communication interface, such that the macro network assigns the LCIB to operate on a particular active set of one or more particular sectors,
the LCIB transmitting data indicative of the particular active set to the macro network using a backhaul connection to the macro network; and
responsive to the LCIB transmitting the data indicative of the particular active set to the macro network, the LCIB receiving a location corresponding to the particular active set from the macro network via the backhaul connection to the macro network.

2. The method of claim 1, further comprising:
the LCIB attempting to determine a location of the LCIB using a satellite-based positioning system receiver, and
wherein the LCIB engaging in communication with the macro network using the wireless communication interface is responsive to the LCIB failing to acquire a satellite-based positioning system fix.

3. The method of claim 2, wherein the LCIB engaging in communication with the macro network using the wireless communication interface is responsive to the LCIB failing to acquire the satellite-based positioning system fix within a predetermined amount of time.

4. The method of claim 1, wherein the LCIB engaging in communication with the macro network using the wireless communication interface comprises the LCIB engaging in air-interface communication with a base station of the macro network.

5. The method of claim 1, wherein the backhaul connection to the macro network comprises a virtual private network (VPN) connection.

6. The method of claim 1, wherein the LCIB transmitting the data indicative of the particular active set to the macro network comprises the LCIB transmitting the data indicative of the particular active set to a server of the macro network, wherein the server performs a data lookup to map the data indicative of the particular active set to the location corresponding to the particular active set.

7. The method of claim 1, further comprising the LCIB registering with the macro network using the received location as a location of the LCIB.

8. A low-cost Internet base station (LCIB) comprising:
a wireless communication interface;
a backhaul connection to a macro network;
a processor; and
data storage comprising instructions executable by the processor to:
engage in communication with the macro network using the wireless communication interface, such that the macro network assigns the LCIB to operate as a mobile station on a particular active set of one or more particular sectors,
transmit data indicative of the particular active set to the macro network over the backhaul connection to the macro network, and
in response to transmitting the data indicative of the particular active set to the macro network, receive over the backhaul connection to the macro network a location corresponding to the particular active set.

9. The LCIB of claim 8, further comprising a satellite-based positioning system receiver,
wherein the instructions further comprise instructions executable by the processor to attempt to determine a location of the LCIB using the satellite-based positioning system receiver, and wherein engaging in communication with the macro network using the wireless communication interface is responsive to failing to acquire a satellite-based positioning system fix.

10. The LCIB of claim 8, wherein the instructions further comprise instructions executable by the processor to register with the macro network using the received location as a location of the LCIB.

11. The LCIB of claim 8, wherein transmitting the data indicative of the particular active set to the macro network comprises the LCIB transmitting the data indicative of the particular active set to a server of the macro network, wherein the server performs a data lookup to map the data indicative of the particular active set to the location corresponding to the particular active set.

12. The LCIB of claim 8, wherein the wireless communication interface comprises an antenna and chipset for communicating with one or more base stations of the macro network over an air interface.

13. A server comprising:
a network communication interface to a macro network;
a processor; and
data storage comprising instructions executable by the processor to:
(i) receive via the network communication interface and from a low-cost Internet base station (LCIB) data indicative of a particular active set of one or more particular sectors of the macro network, and
(ii) responsive to receiving the data indicative of the particular active set, determine a location of the LCIB based at least in part on the particular active set.

14. The server of claim 13, wherein the instructions further comprise instructions executable by the processor to:
responsive to determining the location of the LCIB, determine whether the LOB is authorized to operate in the determined location.

15. The server of claim 13, wherein the instructions further comprise instructions executable by the processor to:
responsive to determining the location of the LCIB, send the determined location of the LCIB to an LOB controller to facilitate registering the LCIB with the macro network.

16. The server of claim 13, wherein determining the location of the LCIB based at least in part on the particular active set comprises mapping the particular active set to a location corresponding to the particular active set using a sector coverage database.

17. The server of claim 16, wherein the sector coverage database stores information that correlates active sets to geographic locations.

18. The server of claim 17:
wherein the geographic locations of the sector coverage database comprise geographic areas, and
wherein mapping the particular active set to a location corresponding to the particular active using the sector coverage database comprises: (i) mapping the particular active set to a particular geographic area using the sector coverage database and (ii) determining a centroid of the geographic area.

19. The server of claim 17, wherein the instructions further comprise instructions executable by the processor to:
receive, for one or more mobile stations, data indicative of one or more sectors of the macro network that the mobile station reports being in coverage of at a given geographic location, and
update the stored information of the sector coverage database based on the received data for the one or more mobile stations.

20. The server of claim 13, wherein the instructions further comprise instructions executable by the processor to:
receive via the network communication interface and from the LCIB data indicative of geographic coordinates of at least one base station within a wireless range of the LCIB, and
wherein determining the location of the LCIB based at least in part on the particular active set comprises determining the location of the LCIB based on the particular active set and the geographic coordinates.

* * * * *